United States Patent [19]

Vaughan et al.

[11] Patent Number: 5,133,953
[45] Date of Patent: Jul. 28, 1992

[54] METHOD OF PREPARING CRYSTALLINE ZSM-20 ZEOLITES (C-2517)

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 686,466

[22] Filed: Apr. 17, 1991

[51] Int. Cl.$^5$ .............................................. C01B 33/34
[52] U.S. Cl. ..................................... 423/328; 423/329
[58] Field of Search ................ 423/326, 328, 329, 330

[56] References Cited

U.S. PATENT DOCUMENTS 3,972,983  8/1976  Ciric .................................... 423/328
4,631,262  12/1986  Altomare ............................ 423/328

OTHER PUBLICATIONS

Chem Abs. 109:160462z.
Barrer, R. M. "Hydrothermal Chemistry of Zeolites" Academic Press 1982, pp. 137-140.

*Primary Examiner*—R. Bruce Breneman
*Attorney, Agent, or Firm*—Ronald D. Hantman

[57] ABSTRACT

An improved method of preparing crystalline aluminosilicate zeolite ZSM-20, that involves preparing a reaction mixture having the formula, expressed in terms of mole ratio of oxides:

$$(9-12)TEA_2O:(1-1.4)Na_2O:Al_2O_3:(20-28)SiO_2:(270-340)H_2O$$

from an alkali metal oxide source, tetraethylammonium (TEA) oxide, an aluminum oxide, a silicon oxide, tetraethylorthosilicate (TEOS) and water and seeding the reaction mixture with a seed solution having the formula, expressed in terms of mole ratio of oxides:

$$(12-16)Na_2O:(0.8-1.2)Al_2O_3:(10-18)SiO_2:(250-500)H_2O$$

and heating the reaction mixture at temperatures ranging from about 80° C. to about 120° C. for a time sufficient to form crystals, wherein the time required for crystallization is shortened.

4 Claims, No Drawings

METHOD OF PREPARING CRYSTALLINE ZSM-20 ZEOLITES (C-2517)

BACKGROUND OF THE INVENTION

1. Field of the Invention

The invention relates to an improved method of preparing the crystalline aluminosilicate zeolite, ZSM-20, by a seeding method which shortens the time required to crystallize the product.

2. Description of the Prior Art

Certain zeolite materials are ordered, have porous crystalline aluminosilicate tetrahedrally coordinated frameworks with specific crystalline structures and have a large number of small cavities interconnected by channels. These cavities and channels are uniform in size and have dimensions that absorb molecules of particular dimensions while rejecting others. As a result, these materials have come to be known as "molecular sieves" and are used in a variety of ways to take advantage of this property.

Molecular sieves include a wide variety of crystalline aluminosilicates having rigid tetrahedral frameworks of silicon and aluminum, crossed-linked by shared oxygen atoms. The electronic valence of the aluminum in the tetrahedra framework may be balanced by adding a cation to the framework. For example, an alkali metal or alkaline earth metal cation may be wholly or partially exchanged by a different cation using conventional ion exchange techniques. As a result, the properties of the aluminosilicate will vary. Of particular interest and importance are large pore 12-ring molecular sieves, such as ZSM-20. U.S. Pat. No. 3,972,983 describes the original method for preparing ZSM-20, which has the general formula:

$$(0.3-0.6)R_2O:(0.4-0.7)M_2O:Al_2O_3:(x)SiO_2$$

where R is a tetraethylammonium cation, M is an alkali metal cation and x is at least 7. The preparation involves forming a reaction mixture comprised of an alkali metal oxide source, preferably sodium oxide, tetraethylammonium oxide, an aluminum oxide, tetramethylorthosilicate (TMOS) source of silicon oxide and water. The reaction mixture, which resembles a gel, is then heated to 50° C. for 1 to 7 weeks and heated again between 90° C. to 120° C. for 2 weeks to 1 month. Digestion of the gel particles occurs until a crystal product forms. The crystals are separated from the reaction mixture by cooling the entire mixture to room temperature, filtering out the crystals and washing them. Finally, the crystals are dried at 100° C., for 1 to 24 hours.

An improved process for preparing ZSM-20 is described in European Patent 0012572, where the TMOS is replaced with tetraethylorthosilicate (TEOS). This method produces a residual ethyl alcohol by-product that is believed to be less detrimental to product quality than the residual methyl alcohol, produced in U.S. Pat. No. 3,972,983 when TMOS is used.

SUMMARY OF THE INVENTION

The present invention is an improved method of preparing the crystalline aluminosilicate zeolite, ZSM-20, wherein a reaction mixture having the formula, expressed in terms of mole ratio of oxides:

$$(9-12)TEA_2O:(1-1.4)Na_2O:Al_2O_3:\\(20-28)SiO_2:(270-340)H_2O$$

is prepared from an alkali metal oxide source, tetraethylammonium (TEA) oxide, an aluminum oxide, a silicon oxide (tetraethylorthosilicate (TEOS)), a source of seeds derived from sodium silicate and water; thereafter heated to form the zeolite. The improvement comprises seeding the reaction mixture with a seed solution having the formula, expressed in terms of mole ratio of oxides:

$$(12-16)Na_2O:(0.8-1.2)Al_2O_3:(10-18)\\SiO_2:(250-500)H_2O$$

and heating the reaction mixture at temperatures ranging from about 80° C. to about 120° C. for a time sufficient to form crystals. The present method prepares the ZSM-20 zeolite crystals in a shorter time.

DETAILED DESCRIPTION

In accordance with the present invention an improved method of preparing the crystal line aluminosilicate zeolite, ZSM-20, has been discovered which involves the steps of (a) preparing a reaction mixture having the formula, expressed in terms of mole ratio of oxides:

$$(9-12)TEA_2O:(1-1.4)Na_2O:Al_2O_3:\\(20-28)SiO_2:(270-340)H_2O$$

from an alkali metal oxide source, tetraethylammonium (TEA) oxide, an aluminum oxide, a silicon oxide, tetraethylorthosilicate (TEOS), water, and a seed solution having the formula, expressed in terms of mole ratio of oxides:

$$(12-16)Na_2O:\\(0.8-1.2)Al_2O_3:(10-18)SiO_2:(250-500)H_2O$$

and (b) heating the reaction mixture at temperatures ranging from about 80° C. to about 120° C. for a time sufficient to form crystals, wherein the time required for crystallization is shortened.

The prior art discloses various forms of seeding to accelerate crystalline growth and control morphology and includes the addition of small crystals and other additives (R. F. Stricktland-Constable, "Kinetics and Mechanism of Crystallization", 1969, Academic Press (London)). Particularly good examples are U.S. Pat. Nos. 3,808,326 and 4,178,352 which describe zeolite seeding compositions, also known as zeolite nucleation centers, that have been used to quickly and efficiently produce crystalline aluminosilicate zeolites. The seed composition is combined with specific ratios of reactive silica, alumina, sodium hydroxide and water, that are known to produce synthetic crystalline aluminosilicate zeolites such as Type A, X and Y zeolites. However, whereas the seed solutions for making A, X and Y only require only about 18 hours aging at about 20° C., in the ZMS-20 syntheses the seeds need to be aged at least twice that period for optimum results.

Although seeding or nucleation "per se" is well known in the art, we have discovered that a particular type of seeding technique reduces the crystallization time necessary for making ZSM-20 zeolite crystals. Seeding was not used originally to prepare ZSM-20 because it was believed to be ineffective. Subsequent work further demonstrated the in effectiveness of other specific seeding methods. See Vaughan et al., *Amer. Chem. Soc. Symp. Ser.*, No. 389 pp. 544–559 (1989) and Daewale et al., *Appl. Catalysis*, Vol. 37, pp. 273-290 (1988).

The present invention is the first successful and effective use of seeding to produce high yield ZSM-20 crystals that are free of impurities. The seeding solution used in the present invention may, for example, be prepared by the methods described in U.S. Pat. Nos. 3,574,538 and 4,340,573, which are incorporated herein by reference. The seeds are preferably pre-aged for about 24 hours to about 7 days and most preferably are pre-aged for at least 24 hours at room temperature. The seeding composition preferably has the formula expressed in terms of mole ratio of oxides:

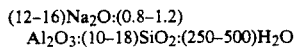

$(12-16)Na_2O:(0.8-1.2)$
$Al_2O_3:(10-18)SiO_2:(250-500)H_2O$

The seed solution is an integral part of the formulation and must be added to the zeolite reaction mixture before it is hydrolyzed. Adding the seed solution before hydrolysis of the reaction mixture is important because the seed solution becomes nonreactive if added after the reaction mixture is hydrolyzed. Similarly, excessive aging of the seed solution over about 60 days at room temperature makes them less reactive for making ZSM-20, an observation contrary to experience in making zeolites A, X and Y with such seed sources.

The zeolite reaction mixture is prepared from materials which supply the appropriate oxides. These include aluminates, alumina, silicates, silica hydrosol, silica gel, silicic acid and basic hydroxides. The crystal size and crystallization time for ZSM-20 will vary, depending on the composition of the reaction mixture. Preferably the reaction mixture contains: an alkali metal oxide, preferably selected from sodium oxide, tetraethylorthosilicate (TEOS), tetraethylammoniumoxide (TEA); aluminum oxide or aluminum sulfate; and water. According to the present invention, the amount excess TEOS added to the reaction mixture is less than twice that shows up in the product. The preferred mole ratio of silicon oxide to aluminum oxide is 20 to 28, however more preferred is 22 to 26.

After the reaction mixture has been prepared the seed solution is added to the mixture and the mixture is heated to about 80° C. to about 120° C. in a vented or open vessel until the tetraethylorthosilicate (TEOS) completely hydrolyzes and the mixture releases ethanol as a by-product. Vigorous mixing helps purge the ethanol by-product from the mixture. The mixture is heated for a time period of about 20 hours to about 7 days. In a preferred embodiment of the present invention, the reaction mixture is heated at temperatures ranging from about 90° C. to about 110° C. for about 30 hours to about 60 hours. The digestion of gel particles that occurs during this period continues until the product crystal forms. The crystallization time may be shortened even further by periodic stirring. Once the crystals form, the reaction mixture is cooled to room temperature, the crystals are filtered from the mother liquid and washed. The crystal product is then dried, at about 230° F., for about 18 hours to about 24 hours. Of course, milder conditions may be employed if desired, e.g., room temperature and under vacuum pressures.

The crystallization time required to produce the product in the present method is shortened dramatically and represents a major improvement over the existing methods for making ZSM-20. Therefore, the present method provides an advantage in the commercial manufacture of ZSM-20.

The original cations of the ZSM-20 zeolite may be exchanged by a wide variety of cations and cation mixtures using exchange methods well known in the art. Typical replacement cations include hydrogen, ammonium, metal cations and mixtures thereof. Of the replacing metallic cations, particular preference is given to rare earth cations, Mn, Ca, Mg, Zn, Cd, Pt, Pd, Ni, Co, Ti, Al, Sn, Fe and Co cations.

The cation exchange technique requires removing the tetraethylammonium cations, which serve as an organic templates, by calcining the zeolite crystals and contacting them with a salt containing the desired replacement cation or cation mixture. Although a wide variety of salts can be used, particularly preferred are chloride, nitrate and sulfate salts. Techniques suitable for conducting the cation exchange are described in a wide variety of patents including, but not limited to, U.S. Pat. Nos. 3,140,249, 3,140,251, and 3,140,253. After the zeolite is contacted with the salt solution, the zeolite is washed with water and dried at temperatures ranging from about 70° C. to about 450° C. Thereafter, the crystals are preferably calcined in air or an inert gas at temperatures ranging from about 300° C. to 800° C. for 1 hour to more than 48 hours.

ZSM-20 zeolites are used in hydrocarbon conversion reactions isomerization, polymerization, aromatization, cracking, hydrocracking and alkylation and converting light aliphatics to aromatics as described in U.S. Pat. Nos. 3,760,024 and 4,021,331.

In order to fully illustrate the nature the manner of practicing the invention, the following examples are presented herein. The examples are not to be considered as limiting the scope of the invention there of since various other forms for carrying out the invention will be apparent to one of ordinary skill in the art.

EXAMPLE 1

Synthesis of ZSM-20 From $10(TEA)_2O$: $1.14Na_2O$: $Al_2O_3$: $24SiO_2$: $304 H_2O$ A seed solution (described in U.S. Pat. Nos. 3,574,538 and 4,340,573) having the composition 13.3 $Na_2O$: $Al_2O_3$: 12.5 $SiO_2$: $267H_2O$ was prepared and preaged two days. 11.7 g of the seed solution was added to 146.4 g tetraethylorthosilicate (TEOS), 220.7 g tetraethylammonium hydroxide (TEA) (40% aqueous solution), 5.6 gms sodium aluminate dissolved in 12 water, and 3.4 g aluminum sulfate ($17H_2O$) dissolved in 6.5 g water. After thorough mixing in a blender, the sample was transferred to a 500 ml container, and placed (uncapped) in an oil bath at 80° C. The TEOS was completely hydrolysized before starting the crystallization reaction, causing ethanol to be released from the reaction mixture as a by-product. The crystallization was accelerated by periodically stirring the mixture by transferring the mixture to a blender about every hour and mixing for about 10 minutes. After 6 hours in the oil bath at 80° C. the jar was capped and heated at 100° C. in an air oven. After 38 hours, the gel reaction mixture crystallized. The gel was then cooled, filtered and washed to recover the ZSM-20 zeolite crystals. An x-ray diffraction pattern of the product is shown in FIG. 1, and is typical of ZSM-20. The n-hexane absorption capacity of the product was 15% (45 torr and 21° C.).

EXAMPLE 2

Synthesis of ZSM-20 From $10(TEA)_2O: 1.14Na_2O: Al_2O_3: 24SiO_2: 320H_2O: 0.53NaSO_4$ 40 g of sodium aluminate (1.14 $Na_2O:Al_2O_3:4H_2O$) was dissolved in 144 g $H_2O$ to form a sodium aluminate solution. The following ingredients were then mixed together: 267.3 g tetraethylorthosilicate (TEOS); 21.3 g of the seed solution described in Example 1, pre-aged 52 days; 402.9 g 40% tetraethylammonium (TEA) hydroxide; 46.9 g of the sodium aluminate; 12.6 g 50% alum $(Al_2(SO_4)_3 \cdot 3.17H_2O)$ solution and distilled water. The water was added until the total weight of solution reached 750 g. The resulting gel was transferred to a 1 liter glass reaction kettle equipped with a heating mantle, reflux condenser, mechanical stirrer and thermometer. The kettle was heated to 100° C. while the contents were stirred. Stirring the gel allowed the ethanol by product to boil off as the kettle lid was opened for approximately 3 hours. After 27.6 hours of the gel was crystallized. The gel was then filtered and washed to recover the crystals which were dried in an oven at 115° C. An x-ray diffraction analysis revealed a crystal product identical to ZSM-20. Elemental analysis gave 24.9% Si; 6.35% Na; 8.85% Al, which represented a product composition of $0.16(TEA)_2O: 0.84Na_2O:Al_2O_3:5.4SiO_2$. After calcining in air at 625° C. for two hours the product absorbed 15.1% n-hexane (45 torr and 21° C.).

EXAMPLE 3

Synthesis of ZSM-20 from $10(TEA)_2O: 1.14Na_2O: Al_2O_3: 24SiO_2: 320H_2O: 0.53 NaSo_4$ A reaction gel was prepared by the procedure described in Example 2 except that the seed solution was pre-aged only for one day. A portion (A) of the gel was placed in a 125 ml container after the ethanol was removed and heated at 100° C. in an oven. The remaining portion (B) was reacted in a kettle and stirred as in Example 2. At various intervals samples of each portion were removed, the crystals filtered, washed with distilled water and dried at 115° C. in an oven. Each portion was monitored by powder x-ray diffraction analysis until maximum crystallinity was attained. After six days, portion B crystallized ZSM-20, and after ten days portion A crystallized. Elemental analysis provided:
(Portion B) 4.61% Na; 7.28% Al; 25.7% Si; Si/Al=3.39
(Portion A) 4.82% Na; 7.37% Al; 25.9% Si; Si/Al=3.38. The crystalline product derived from portion B absorbed 19.6% n-hexane (45 torr after being calcined in air at 625° C. for two hours).

Examples 2 and 3 illustrate the importance of seed age on crystallization times in accordance with the present invention. The older more mature seed, preferably the aging is more than one day, was found to be more effective. Stirring has the effect of reducing the crystallization time, presumably by a process known as "collision breeding" or "seed attrition") which increases the effective nucleation rate.

What is claimed is:

1. In a method of preparing the crystalline aluminosilicate zeolite, ZSM-20, wherein a reaction mixture having the formula, expressed in terms of mole ratio of oxides:

$$(9-12)TEA_2O:(1-1.4)Na_2O:Al_2O_3: (20-28)SiO_2:(270-340)H_2O$$

is prepared from an alkali metal oxide source, tetraethylammonium (TEA) oxide, aluminum oxide, silicon oxide (tetraethylorthosilicate (TEOS)), a source of seeds and water and heated to form the zeolite, the improvement comprising:

(a) seeding the reaction mixture prior to step (b) with a seed solution which is pre-aged for time period less than 60 days and having the formula, expressed in terms of mole ratio of oxides:

$$(12-16)Na_2O:(0.8-1.2)Al_2O_3:(10-18)SiO_2:(250-500)H_2O$$

(b) hydrolyzing the TEOS and removing the ethanol hydrolysis product, and (c) heating the reaction mixture at temperatures ranging from about 80° C. to about 120° C. for a time less than 5 days sufficient to form crystals, wherein the time required for crystallization is shortened.

2. The improvement of claim 1 wherein the seed solution if pre-aged for a time period of greater than 2 days and less than 60 days.

3. The improvement of claim 1 wherein the heating time ranges from about 20 hours to about 60 hours.

4. The improvement of claim 3 wherein the heating time ranges from about 20 hours to about 40 hours.

* * * * *